April 25, 1944.  W. R. FORD  2,347,475
OAR OR PADDLE
Filed Jan. 26, 1943
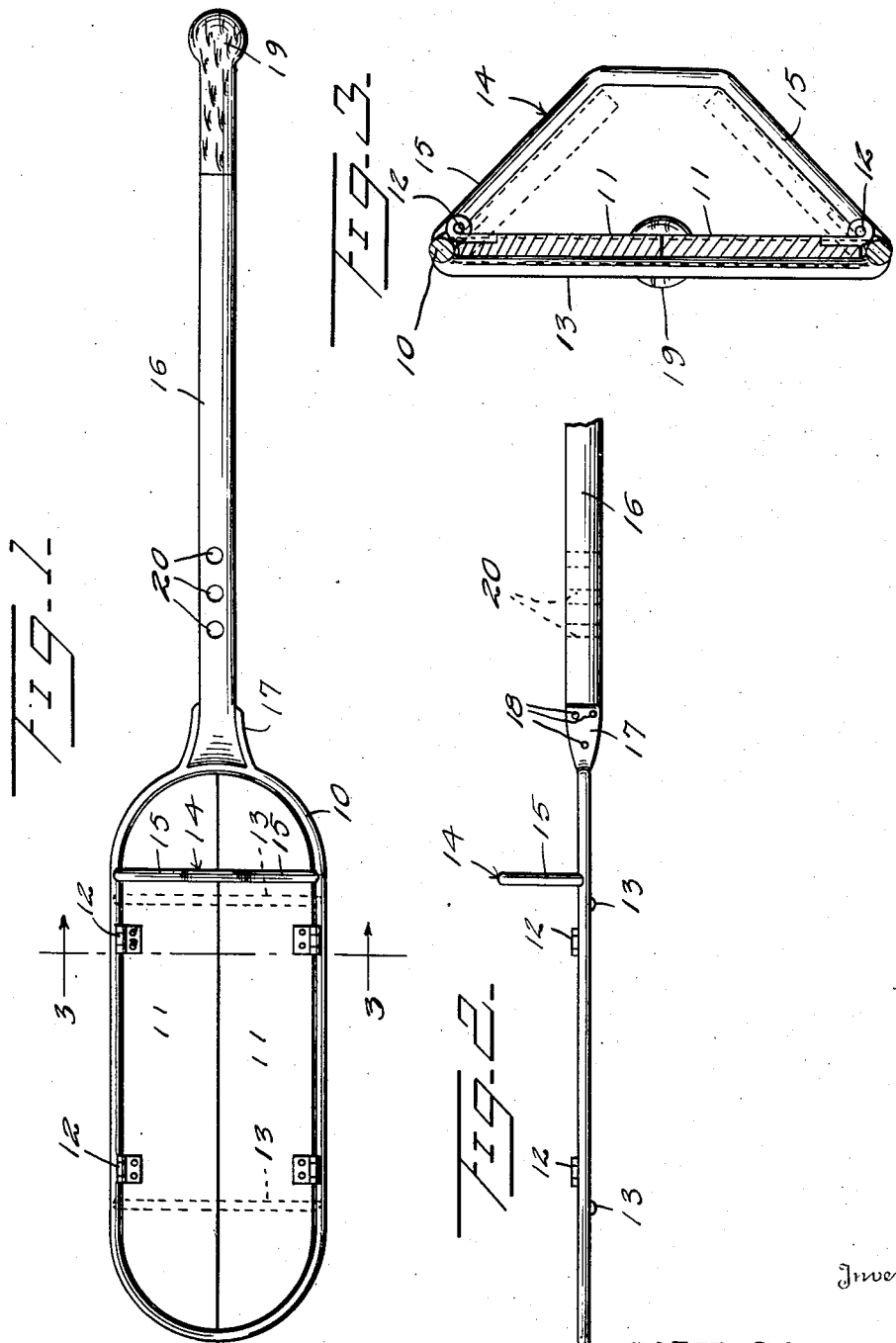
Inventor
W. R. Ford
By L. F. Rudolph
Attorney Patented Apr. 25, 1944

2,347,475

UNITED STATES PATENT OFFICE 2,347,475

OAR OR PADDLE

William R. Ford, Drumright, Okla.

Application January 26, 1943, Serial No. 473,642

1 Claim. (Cl. 9—24)

This invention relates to an oar or paddle.

It especially is aimed to provide a novel structure having wings or blades which will remain closed during the power stroke and which will open automatically to permit the passage of water therethrough on the take-up stroke.

It further is aimed to provide a structure which is relatively simple and inexpensive, which is strong and durable, having a novel frame within which the wings or blades are hinged, in combination with stop means to define and limit the movement of the wings or blades, a construction which will enable the depth of the oar or paddle in the water to be gauged, and a construction which will remain afloat if dropped in the water.

The more specific objects and advantages will become apparent from a consideration of the description following taken in connection with accompanying drawing illustrating an operative embodiment.

In said drawing:

Figure 1 is a plan view of the oar or paddle;

Figure 2 is a view in side elevation thereof, being partly broken away; and

Figure 3 is an enlarged cross-section taken on the plane of line 3—3 of Figure 1.

Referring specifically to the drawing wherein like reference characters designate like or similar parts, the oar or paddle is provided with a frame 10 which is open and of any desired size or shape. Fitted within the frame are similar wings or blades 11 pivoted as at 12 by means of hinges to such frame. During the power stroke, the blades or wings 11 are closed as shown in full line in the drawing, being in the same plane as the frame and in contact with one or more stop bars 13 integral with or fastened to and spanning the frame.

Said wings or blades remain in such closed position during the power stroke, but through impingement with the water on the take-up stroke such wings or blades automatically open to the dotted line position shown in Figure 3, thus enabling passage of water through the frame. Movement of the wings or blades to such dotted line position of Figure 3 is limited by their abutment against an arch-shaped stop bar 14, preferably having angle portions 15 against which the wings or blades respectively abut.

To enable manipulation of the oar or paddle with the length of the blades or wings 11 in vertical position, a handle 16 is provided which may be secured in any suitable manner to frame 10, for instance by means of lugs 17 on such frame between which the handle is fitted and through which handle and lugs bolts or rivets 18 are passed.

At the upper end of the handle, it is preferably provided with a head of cork or equivalent material 19, which will float and which will prevent sinking of the oar or paddle in the event that it falls into the water.

A series of holes or openings 20 may be provided in the handle adjacent the frame, to serve as gauges, enabling the user to gauge the depth of operation of the oar or paddle in the water.

It will be clear that in the use of the device, its longitudinal axis is vertical and that the device is operated in the same manner as the usual oar or paddle, with the wings or blades 11, however, remaining closed and in abutting contact with the stop bar 13 on the power stroke, while automatically opening to the dotted line position of Figure 3 on the take-up stroke.

Attention is called to the fact that aside from the float material used at 19, the other parts may be made of any desired material, that is, wood, metal, plastic, or any combination of them or any equivalent.

Various changes may be resorted to provided they fall within the spirit and scope of the invention.

I claim as my invention:

An oar or paddle having an open frame provided with parallel side members, blades hinged to the respective side members, abutment means on the frame engageable by the blade means to maintain the latter closed and coplanar on the power stroke, and arched abutment means extending from one frame member to the other and opposed to the first abutment means, said abutment means serving to brace the frame and engageable by the blade means to limit opening movement of the blade means on the take-up stroke, and a handle extending from said frame.

WILLIAM R. FORD.